Patented Jan. 27, 1948

2,435,125

UNITED STATES PATENT OFFICE 2,435,125

PURIFICATION OF TRYPTOPHANE

Edgar C. Britton and John E. Livak, Midland, Mich., assignors to The Dow Chemical Company, Midland, Mich., a corporation of Delaware No Drawing. Application October 23, 1944, Serial No. 560,033

14 Claims. (Cl. 260—319)

This invention concerns an improved method for the purification of crude tryptophane.

Boyd et al., in Biochem. J. 29 2256-8 (1935), have disclosed the preparation of tryptophane by heating a mixture of indolalhydantoin and an aqueous ammonium sulphide solution in a closed vessel at 100° C. and thereafter removing the mixture and evaporating it to dryness under vacuum. The crude tryptophane obtained as the residue was extracted first with carbon bisulphide to remove free sulphur and then with a large volume of aqueous ammonia to dissolve the tryptophane. The aqueous extract was decolorized with animal charcoal, evaporated to one-fourth its volume, diluted with four volumes of alcohol and tryptophane was crystallized from the resultant solution. The yield of pure tryptophane was between 50 and 60 per cent. A final crop of impure crystalline tryptophane increased the yield to about 70 per cent. Approximately 69 per cent of the tryptophane was obtained in satisfactorily pure form. Because of the inconvenience of the steps, particularly that of employing the volatile and flammable compound, carbon bisulphide, as an extractant, and because of the low yield of satisfactorily pure tryptophane, the purification procedure disclosed is not well suited to commercial practice.

Tryptophane, when produced commercially, i. e., in iron or steel apparatus, by the reaction between indolalhydantoin and an aqueous ammonium sulphide solution with subsequent evaporation of the mixture, is obtained in a crude form containing free sulphur, iron compounds, presumably iron hydroxides, and tarry by-products of unknown identity. It is an object of this invention to provide an improved method for the purification of crude tryptophane which is adapted to commercial practice and which permits recovery of the tryptophane in high yield and substantially pure form. Other objects will be apparent from the following description of the invention.

The present method consists essentially in (1) dissolving the crude tryptophane in an aqueous or an aqueous-alcohol medium which is of pH value outside the range of from 5 to 9, (2) filtering to remove the impurity which remains undissolved, (3) adding a neutralizing agent in amount such as to vary the pH value through and outside of the range of from 5 to 9, (4) treating one of the foregoing solutions of tryptophane with a bleaching agent such as activated charcoal or a bleaching earth, etc., and removing the bleaching agent by filtration or decantation, and, after bringing the mixture outside the pH range of from 5 to 9 for the second time and filtering to remove the impurity which is precipitated, (5) adding a neutralizing agent in amount sufficient to give the mixture a pH value within the range of from 5 to 9, preferably from 6 to 8, and (6) crystallizing tryptophane from the resultant mixture. In practice the third of the foregoing operations is advantageously, though not necessarily, carried out in stages, i. e., the crude tryptophane solution, which is initially of a pH value outside the range of from 5 to 9 and which has been filtered to remove the undissolved impurity, is advantageously brought to a pH value within the range of from 5 to 9 so as to precipitate tryptophane in partially purified form. The precipitate is separated, e. g., by filtration, and is redissolved in an aqueous, or aqueous-alcohol, medium of pH value outside the range of from 5 to 9 and remote from that initially used, i. e., if the tryptophane was initially dissolved in an acidic medium it is now dissolved in an alkaline medium and vice versa. This modification of the above-mentioned operation (3) renders it more certain that satisfactory purification will be attained. However, said operation can be carried out as a single step and usually with satisfactory results. The following is a more detailed discussion of the steps and conditions to be employed in practicing the invention.

Because of the fact that tryptophane is amphoteric, it may, as was just stated, initially be dissolved in either an acidic or an alkaline medium, even though tryptophane itself is only sparingly soluble in water or alcohol. The acidic or alkaline medium may be of any concentration, but is preferably dilute, e. g., it preferably contains less than 20 per cent by weight of a dissolved acid or alkali. When an alkali is to be used to dissolve the compound, an alkali metal hydroxide, e. g., sodium, potassium or lithium hydroxide, is employed. Ammonium hydroxide can be used to cause solution, but because of the relatively low solubility of tryptophane in aqueous ammonia and the reluctance with which the compound crystallizes once it is dissolved in such dilute solution, the use of ammonia necessitates an extra step of subsequently evaporating the solution in order to obtain satisfactory crystallization. Sodium carbonate has also proven unsatisfactory as an agent for causing dissolving of the tryptophane. When the tryptophane is to be dissolved by means of an acid, any of the usual mineral acids except phosphoric acid may be used. Phosphoric acid, presumably due to formation of a complex compound with tryptophane, interferes with the subsequent crystallization of the latter. Examples of acids which are suitable are hydrochloric, hydrobromic, sulphuric and nitric acids, etc. In practice hydrochloric acid is preferred.

The quantity of the liquid medium, i. e., water or aqueous alcohol, should of course be sufficient to dissolve the tryptophane under the acidic or alkaline conditions employed, but should be restricted so as to avoid necessity of evaporating the solution in order subsequently to crystallize nearly all of the tryptophane. In practice, not more than 100, and preferably between 5 and 10, parts by weight of the medium is used per part of the crude tryptophane. Although water alone may satisfactorily be used as the medium, the crystalline product is usually of better appearance, i. e., more nearly colorless, when aqueous methanol or aqueous ethanol of between 50 and 90 per cent by weight concentration is used.

It should be mentioned that tryptophane is less stable toward heat when in an acidic or alkaline medium than when in neutral condition. For this reason, extensive heating or boiling of the acidic or alkaline solution is preferably avoided. In practice, the tryptophane is dissolved by stirring the same together with the solvent, rather than by prolonged heating, and the non-neutral solution is maintained at temperatures below 70° C. until neutralized. However, boiling for short periods of time, e. g., 5 or 10 minutes, usually does not cause excessive decomposition of the product. During the treatment of the solution with a decolorizing agent, the mixture is usually heated, e. g., at 50 to 70° C., in order to accelerate the bleaching action.

Although the crude tryptophane may be dissolved in either an acidic or an alkaline medium to leave one of its normal impurities as a residue, the kind of impurity remaining undissolved is dependent upon whether an acid or an alkali is used. When the crude tryptophane is initially dissolved in an aqueous or alcoholic solution of an acid, the sulphur impurity remains undissolved, but the iron-containing impurities go into solution. On the other hand, when an alkali solution is used to dissolve the crude tryptophane, the iron-containing impurities remain as a residue, e. g., as iron hydroxides, but an appreciable amount of sulphur is dissolved. In either instance, the residual impurity is removed, e. g., by filtration, and the solution is treated with a bleaching agent which is removed by filtration.

An acid or alkali, e. g., hydrochloric acid, sulphuric acid, sodium hydroxide, sodium carbonate, or ammonia, etc., is added as necessary in order to bring the solution to a pH value between 5 and 9 and preferably from 6 to 8. When, at this stage in the process, the solution is brought from an acidic condition to such pH value, tryptophane and iron-containing impurities are thrown out of solution, but when the solution is brought from an alkaline condition to such pH value, sulphur is precipitated together with the tryptophane. The mixture is filtered to separate the partially purified tryptophane from the liquor which usually retains soluble organic impurities. The partially purified tryptophane is redissolved in an aqueous or aqueous-alcohol medium of a pH value outside the range of from 5 to 9 and such as not to dissolve the remaining inorganic impurity, i. e., if the inorganic impurity remaining together with the tryptophane is sulphur, the tryptophane is redissolved in an acidic medium, but if the remaining inorganic impurity is an iron compound the tryptophane is redissolved in an alkaline medium.

As hereinbefore indicated, the steps stated in the preceding paragraph may be combined and accomplished as a single step, i. e., the initial filtered solution of the crude tryptophane, which is of pH value outside the range of from 5 to 9 may be treated with an acid or an alkali as necessary to bring its pH value through and beyond the pH range of from 5 to 9. The result is that the tryptophane remains in solution, but the inorganic impurity, i. e., sulphur or an iron compound, remaining associated therewith is precipitated.

The mixture obtained as in either of the two preceding paragraphs is filtered to remove the insoluble impurity and the filtrate is brought to a pH value between 5 and 9, preferably between 6 and 8. Within a short time, usually a few minutes, after being brought to such pH value, tryptophane crystallizes from the solution. When employing tryptophane solutions of the concentrations hereinbefore recommended, the crystallization often occurs so rapidly as to amount to a precipitation. However, the rate of crystallization varies with changes in the temperature and concentration of the tryptophane solution. It is usually advisable to permit the mixture to stand for a half hour or longer in order to assure substantially complete crystallization of the product. If necessary, crystallization may, of course, be initiated by seeding the solution with crystals of tryptophane. The crystalline product is separated, e. g., by filtration, washed free of adhering mother liquor, and dried.

The method just described permits recovery, in purified form, of more than 90 per cent of the tryptophane in the crude starting material.

The following examples illustrate certain ways in which the principle of the invention has been applied, but are not to be construed as limiting the invention.

*Example 1*

Fifty grams of crude tryptophane, which had been prepared by reacting indolalhydantoin with an aqueous ammonium sulphide solution and thereafter evaporating the mixture to dryness, was admixed with 180 grams of an aqueous hydrochloric acid solution of 5 per cent concentration and the mixture was filtered. As the residue, there was obtained 10.5 grams of sulphur. The filtrate was diluted with 200 cubic centimeters of methyl alcohol, treated with 4 grams of activated charcoal, heated to about 50° C. for approximately 10 minutes and filtered. The filtrate was neutralized by treatment with an aqueous sodium hydroxide solution of 10 per cent concentration, whereby tryptophane was precipitated. The product was separated by filtration, washed with methanol and dried. There was obtained 31 grams of substantially pure and nearly colorless tryptophane which, however, retained a trace of iron hydroxide. The mother liquor from the last mentioned filtration retained in solution by-products which are tarry when separated by evaporation, but it retained little if any tryptophane.

*Example 2*

47.8 grams of crude tryptophane of the quality described in Example 1 was digested at a temperature of from 50 to 60° C. with 250 cubic centimeters of a 1-normal aqueous hydrochloric acid solution and the mixture was filtered to remove sulphur. The filtrate was treated with about 5 grams of activated charcoal, again filtered, and then neutralized by treatment with a 2-normal sodium hydroxide solution to a pH value of 7, whereby tryptophane was precipitated. The tryptophane was separated by filtration, washed with methyl alcohol and dried. There was obtained 30.7 grams of substantially pure tryptophane as a creamish-white powder, which, however, retained a trace of iron hydroxide.

*Example 3*

The purpose of this example is to illustrate completion of the purification partially accomplished as in Example 2 and also to illustrate the high yield in which tryptophane is recovered when treated in accordance with the invention. Tryptophane which had been subjected to purification as in Example 2, and which contained a trace of iron hydroxide, was employed as a starting material. One part by weight of the partially purified tryptophane was admixed with approximately 3 parts of methyl alcohol, 2.84 parts of water and 0.208 part of sodium hydroxide. The mixture was filtered and the filtrate was treated with 0.1 part of activated charcoal and heated to 50 to 55° C. for about 10 minutes. It was again filtered and the filtrate was cooled to room temperature and neutralized by the gradual addition of an aqueous hydrochloric acid solution of 10 per cent concentration. The mixture was again filtered and the filtrate was permitted to stand for 8 hours at room temperature to permit crystallization of the trytophane. The latter was separated by filtration, and washed first with aqueous alcohol and dried by warming the same at 80° C. for 12 hours. The product was pure colorless tryptophane. The weight of the purified product was 95.3 per cent of that of the partially purified tryptophane subjected to the treatment, i. e., the recovery of the tryptophane was greater than 95 per cent of theoretical.

*Example 4*

Fifty-two pounds of crude tryptophane obtained by reacting indolalhydantoin with an aqueous ammonium sulphide solution in a steel reactor and subsequently evaporating the mixture, was stirred for one-half hour together with 147 pounds of an aqueous hydrochloric acid solution of 5 per cent concentration. The mixture was filtered. As the residue, there was obtained 17 pounds of sulphur. The filtrate was diluted with 130 pounds of methyl alcohol and decolorized by warming the same together with 3 pounds of activated charcoal, and the mixture was filtered. The filtrate was neutralized by treatment with a cold aqueous sodium hydroxide solution, whereby tryptophane was precipitated. The precipitate was separated by filtration, washed with methyl alcohol and dried. There was obtained 34 pounds 11 ounces of substantially pure tryptophane which, however, contained a trace of iron hydroxide. The tryptophane was redissolved by stirring the same together with 105 pounds of an aqueous sodium hydroxide solution of approximately 6.9 per cent concentration. The mixture was filtered and the filtrate was neutralized by the gradual addition, with stirring, of an aqueous hydrochloric acid solution of 9.6 per cent concentration. The tryptophane thus precipitated was separated by filtration, washed with methyl alcohol and dried. There was obtained 33 pounds of pure tryptophane.

Other modes of applying the principle of the invention may be employed instead of those explained, change being made as regards the method herein disclosed, provided the step or steps stated in any of the following claims or the equivalent of such stated step or steps be employed.

We therefore particularly point out and distinctly claim as our invention:

1. A method for the purification of crude tryptophane containing sulphur and an iron compound as impurities, which method comprises dissolving the tryptophane in an aqueous medium of a pH value outside the range of from 5 to 9 to form a tryptophane solution which is also of a pH value outside the range of from 5 to 9, treating the solution with a solid, adsorptive decolorizing agent, filtering, changing the pH value of the filtrate through and beyond the range of from 5 to 9, again filtering, and bringing the filtrate to a pH value between 5 and 9 so as to crystallize tryptophane therefrom, while maintaining the tryptophane-containing mixture substantially free of phosphate ions during each of the steps just stated, and separating the crystalline product.

2. The method as described in claim 1, wherein the tryptophane is caused to crystallize by bringing the mixture to a pH value between 6 and 8.

3. The method as described in claim 1, wherein less than 100 parts by weight of the aqueous medium is employed per part of the crude tryptophane.

4. The method as described in claim 1, wherein the crude tryptophane is dissolved by treatment with less than 100 parts by weight of a nonneutral aqueous solvent comprising from 50 to 90 per cent by weight of a monohydric alcohol having less than three carbon atoms in the molecule.

5. The method as described in claim 1, wherein crude tryptophane is dissolved by treatment with less than 100 parts by weight of a nonneutral aqueous solvent comprising from 50 to 90 per cent by weight of a monohydric alcohol having less than three carbon atoms in the molecule and the tryptophane is caused to crystallize by bringing the mixture to a pH value betwen 6 and 8.

6. In a method wherein an aqueous ammonium sulphide solution and indolalhydantoin are reacted in the presence of iron and the mixture is thereafter evaporated to obtain a residue of crude tryptophane, the steps of purifying the tryptophane which consist in dissolving it in an acidic aqueous medium that is substantially free of phosphate ions to form a tryptophane solution which is of a pH value below 5, treating the solution with a solid, adsorptive decolorizing agent, filtering, treating the filtrate with sufficient alkali to bring the resultant mixture to a pH value between 5 and 9 and crystallizing tryptophane from the resulting mixture, separating the crystalline product, redissolving the tryptophane in an alkaline aqueous medium to form a tryptophane solution which is of pH value greater than 9, filtering, bringing the filtrate to a pH value between 5 and 9 to crystallize tryptophane therefrom, and separating the crystalline tryptophane.

7. The method as described in claim 6, wherein each of the successive crystallizations of tryptophane is from a solution of pH value between 6 and 8.

8. The method as described in claim 6, wherein less than 100 parts by weight of the aqueous medium per part of tryptophane is employed in each operation of dissolving the tryptophane.

9. The method as described in claim 6, wherein the crude tryptophane is dissolved by treatment with less than 100 parts by weight of an acidic aqueous alcoholic medium, containing from 50 to 90 per cent by weight of a saturated monohydric alcohol having less than three carbon atoms in the molecule, and an alkali is added to the filtrate in amount such as to bring the mixture to a pH value between 6 and 8.

10. In a method wherein an aqueous ammonium sulphide solution and indolalhydantoin are reacted in the presence of iron and the mixture is thereafter evaporated to obtain a residue of crude tryptophane, the steps of purifying the tryptophane which consist in dissolving it in an aqueous medium containing a dissolved alkali metal hydroxide to form a tryptophane solution having a pH value higher than 9, treating the solution with a solid, adsorptive decolorizing agent, filtering, adding an acid in amount such as to bring the mixture to a pH value between 5 and 9, and crystallizing tryptophane therefrom, again filtering, redissolving the tryptophane in an aqueous medium containing a dissolved acid to form a solution of pH value lower than 5, filtering, bringing the filtrate to a pH value between 5 and 9 to crystallize tryptophane therefrom, and separating the crystalline tryptophane.

11. The method as described in claim 10, wherein less than 100 parts by weight of the aqueous medium is, in each instance, employed per part of the tryptophane in dissolving the latter.

12. The method as described in claim 10, wherein less than 100 parts by weight of an aqueous medium consisting of an aqueous alcohol of between 50 and 90 per cent by weight concentration, which alcohol has less than three carbon atoms in its molecule, is, in each instance, employed per part of the tryptophane in dissolving the latter.

13. The method as described in claim 10, wherein the crude tryptophane is dissolved by treatment with not more than 100 parts by weight of the alkaline aqueous medium and an acid is thereafter added in amount such as to bring the mixture to a pH value between 6 and 8.

14. The method as described in claim 10, wherein the crude tryptophane is dissolved by treatment with not more than 100 parts by weight of a solution of an alkali metal hydroxide in a medium consisting of an aqueous alcohol of between 50 and 90 per cent by weight concentration, which alcohol has less than three carbon atoms in its molecule, and the solution is thereafter treated with an acid in amount such as to bring the mixture to a pH value of from 6 to 8.

EDGAR C. BRITTON.
JOHN E. LIVAK.

REFERENCES CITED

The following references are of record in the file of this patent:

Boyd et al., "Biochem. Jour.," vol. 29 (1935), pages 2256–2258.